United States Patent
Freier et al.

(12) 
(10) Patent No.: US 6,198,094 B1
(45) Date of Patent: Mar. 6, 2001

(54) NESTED FIBER OPTIC GYRO SYSTEM

(75) Inventors: Lawrence Joel Freier, Lexington; Jerold Philip Gilmore, Westford; Ernest Eugene Nolan, Malden, all of MA (US)

(73) Assignee: System Engineering Solutions, Inc., Bedford, MA (US)

( * ) Notice: Subject to any disclaimer, the term of this patent is extended or adjusted under 35 U.S.C. 154(b) by 0 days.

(21) Appl. No.: 09/203,761

(22) Filed: Dec. 2, 1998

Related U.S. Application Data

(60) Provisional application No. 60/069,010, filed on Dec. 10, 1997.

(51) Int. Cl.[7] ............................... G01D 5/34; G01C 19/00
(52) U.S. Cl. ............................... 250/231.12; 250/227.14; 356/350

(58) Field of Search ........................... 250/227.11, 227.14, 250/227.19, 227.27, 231.1, 231.12; 356/350, 345; 385/12, 13, 115; 242/333.6

(56) References Cited

U.S. PATENT DOCUMENTS 5,545,892 * 8/1996 Bilinski et al. .................. 250/232.12

* cited by examiner

Primary Examiner—John R. Lee
Assistant Examiner—Kevin Pyo
(74) Attorney, Agent, or Firm—Kirk Teska; Iandiorio & Teska

(57) ABSTRACT

A nested fiber optic gyro system includes at least a first fiber optic coil having a predetermined shape and size and at least a second fiber optic coil having the same shape and size as the first coil and nested within and transversely to the first coil.

17 Claims, 4 Drawing Sheets

NESTED FIBER OPTIC GYRO SYSTEM

PROVISIONAL APPLICATION

This application claims the benefit of Provisional Application Ser. No. 60/069010 filed Dec. 10, 1997.

FIELD OF INVENTION

This invention relates to a nested fiber optic gyro system.

BACKGROUND OF INVENTION

In a conventional construction of fiber optic gyros for sensing angular rate in three axes, each fiber optic coil is mounted on one of three orthogonal surfaces. This allows each coil to be wound on a circular bobbin with the same dimensions so the coils for each axis are common and interchangeable. Each coil is typically individually packaged in a container that provides the necessary magnetic shielding and thermal isolation provisions. However, the separate mounting of each makes for a relatively large, heavy and costly gyro system.

SUMMARY OF INVENTION

It is therefore an object of this invention to provide a nested fiber optic gyro system.

It is a further object of this invention to provide such a nested fiber optic gyro system which is lighter and more compact at any scale.

It is a further object of this invention to provide such a nested fiber optic gyro system which is less expensive to build and inventory.

It is a further object of this invention to provide such a nested fiber optic gyro system in which all the coils are the same size and shape.

It is a further object of this invention to provide such a nested fiber optic gyro system which allows for the implementation of common thermal, magnetic and mechanical packaging.

It is a further object of this invention to provide such a nested fiber optic gyro system which allows for gyro performance scaling by virtue of different fiber lengths and/or different size of coils, all identical.

The invention results from the realization that a truly simple yet effective gyro system can be achieved using two or more fiber optic coils of the same size and nested one within the other and mutually transverse to one another.

This invention features a nested multiaxis fiber optic gyro system including at least a first fiber optic coil having a predetermined shape and size and at least a second fiber optic coil having the same shape and size as the first coil and nested within and transversely to the first coil.

In a preferred embodiment there may be a third fiber optic coil nested with and transverse to the first and second coils. The third coil may surround the first and second coils. It may have the same shape and size as the first and second coils. The first and second coils may be oblong or elliptical and the third coil may be oblong or elliptical. The first and second coils may be rectangular and the third coil may be rectangular. The first and second coils may be arranged nominally orthogonally to one another. All three coils may be arranged mutually orthogonal to each other. There may be a support and an alignment structure having four spaced alignment elements defining two transverse mounting channels one for supporting each of the transverse nested first and second coils. The support and alignment structure may also include a base. The third coil may be mounted on the base surrounding and transverse to the first and second coils.

The invention also features a nested fiber optic gyro system including a first elliptical fiber optic coil having a predetermined size and a second elliptical fiber optic coil having the same size as the first coil and nested within and transversely to the first coil. In a preferred embodiment the coils may be orthogonal to one another.

The invention also features a nested fiber optic gyro system including first, second and third elliptical fiber optic coils having the same size and nested within and transversely to each other.

In a preferred embodiment the coils may be mutually orthogonal to one another.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

Figure 1:
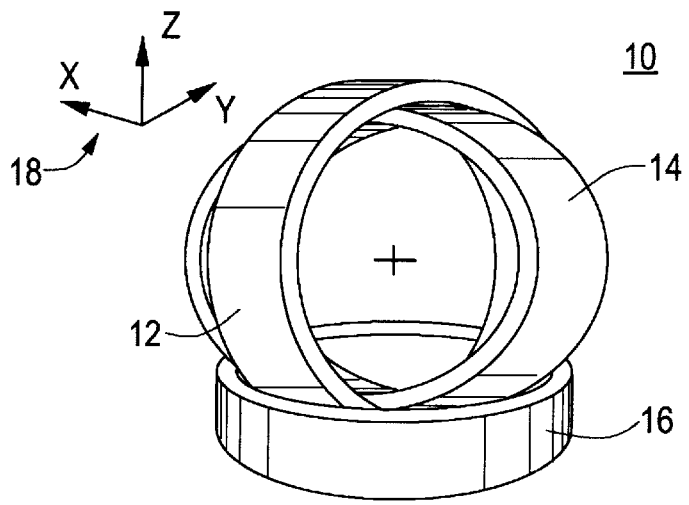
FIG. 1 is three-dimensional view of a three-axis nested fiber optic gyro system according to this invention.
Figure 2:
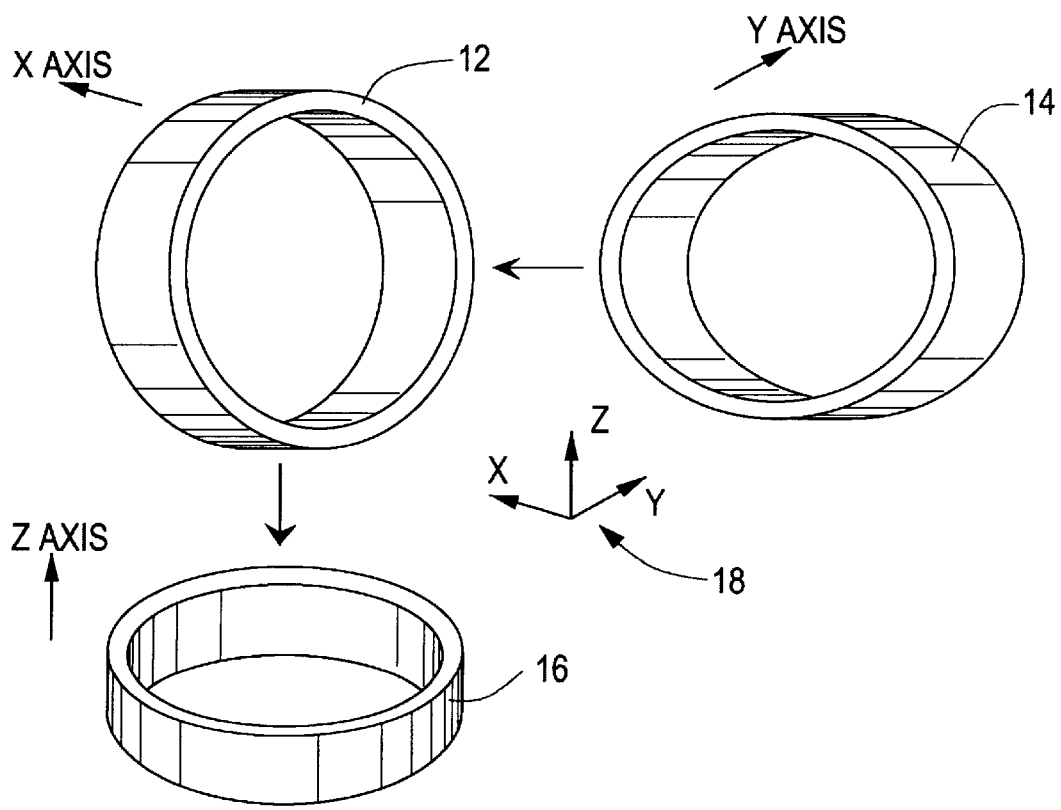
FIG. 2 is an exploded three-dimensional view of FIG. 1 showing each of the coils prior to assembly.
Figure 3:
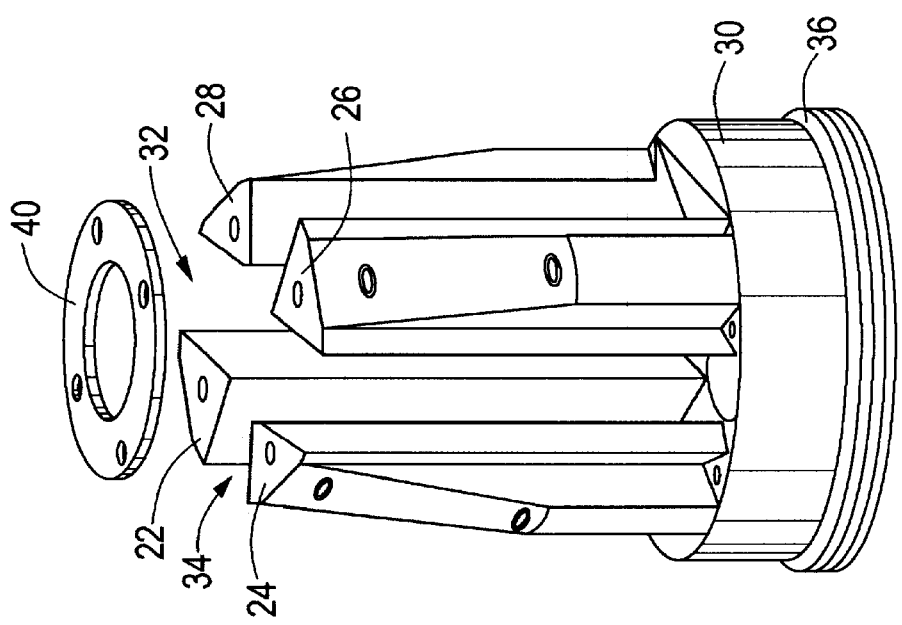
FIG. 3 is a three-dimensional view of a support and alignment structure for holding the coils of FIGS. 1 and 2.

There is shown in FIG. 1 a nested fiber optic gyro system 10 according to this invention including three fiber optic coils 12, 14 and 16. Since ellipses have two different length axes, coil 12 can be rotated with respect to coil 14 until the inner diameter of coil 12 is sufficient to accept the confronting portion of coil 14. Both coils may then be nested with coil 16 which can surround either end of the pair formed by coils 12 and 16. In this way all three are nested together to form a multiaxis, in this case, three axis, sensing gyro assembly in an extremely compact and lightweight package. The coils 12, 14 and 16 are mutually transverse to one another and preferably are mutually orthogonal to one another, as can be seen by the diagram 18 showing the axes X, Y and Z. Coil 14, FIG. 2, is aligned on the Y axis and is nested in coil 12 which is aligned with the X axis. The nested pair of coils 12 and 14 are then nested within coil 16 which is aligned with the Z axis. The coils may be arranged in a coil support and alignment structure 20, FIG. 3, which contains four spaced alignment elements 22, 24, 26 and 28, mounted on a base 30.

Figure 4:
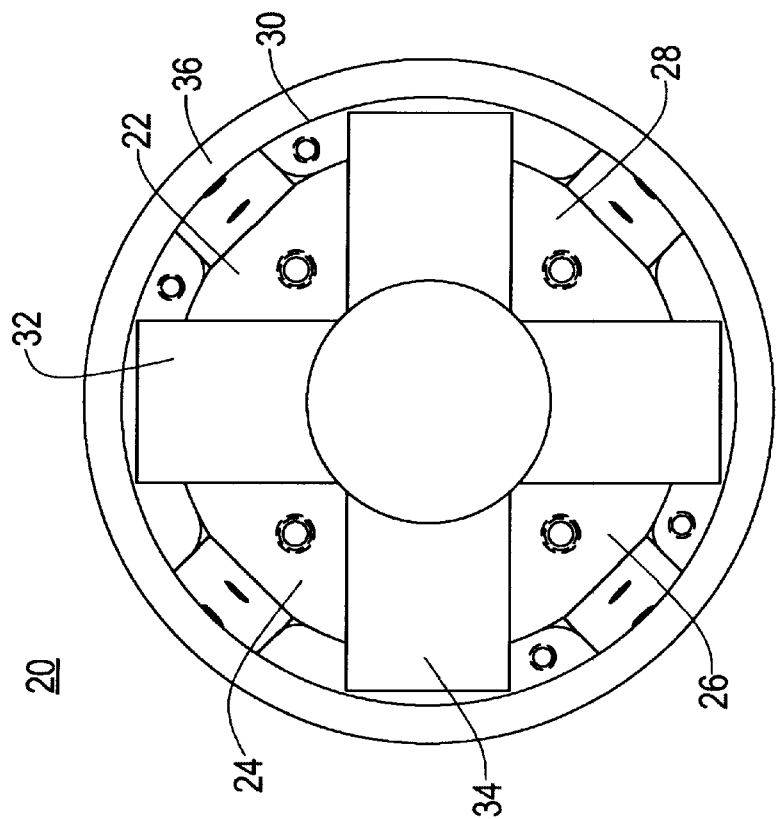
FIG. 4 is a top plan view of the support and alignment structure of FIG. 3.
Figure 5:
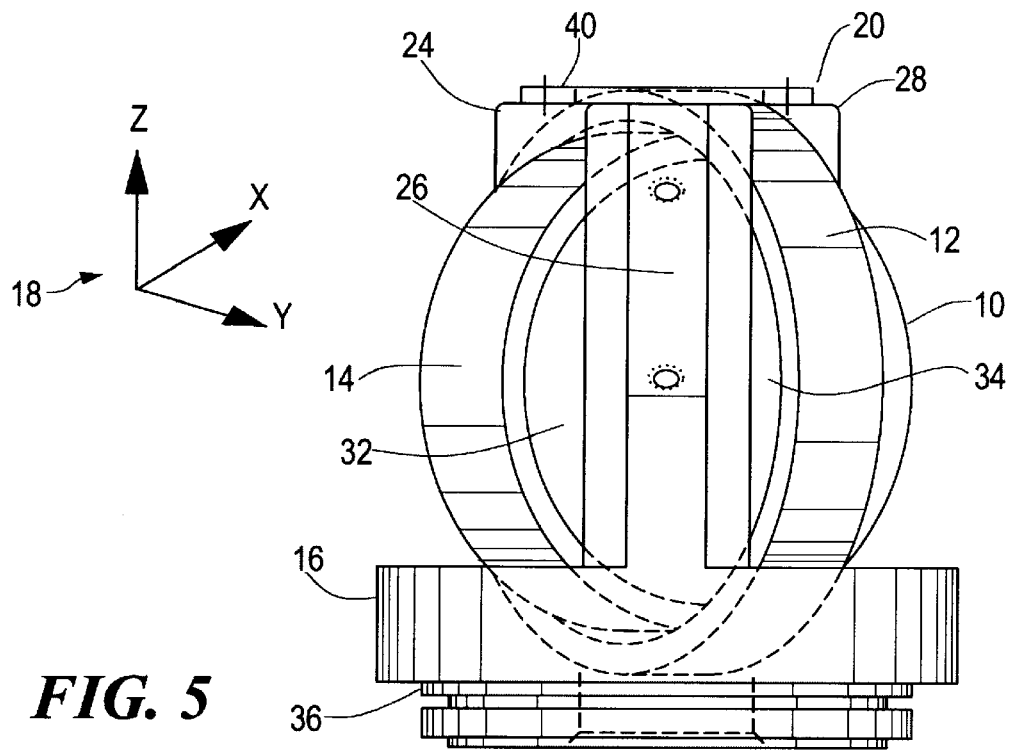
FIG. 5 is a side elevational view showing the coils of FIGS. 1 and 2 mounted in the support and alignment structure of FIG. 3.

As can be better seen in FIG. 4, alignments 22, 24, 26 and 28 form two channels or slots 32 for receiving coil 14 and channel or slot 34 for receiving coil 12. A lip or shoulder 36 on base 30 serves to support coil 16 as can be seen more clearly from FIG. 5 so that it surrounds the other two coils. A clamp 40, FIG. 3, may be used to secure coils 12 and 14 in place on support and alignment structure 20. Coil 16 may be secured by clamps holding it in place on the support and alignment structure 20. The optical fibers used to wind the coils may be a 1300 nm polarization maintaining fiber with two coatings, the primary coating being soft ultraviolet acrylate and the secondary coating being hard ultraviolet acrylate. The fiber use is not restricted to the aforementioned wavelength and type. The operating temperature range is from −55° C. to +125° C. A minimum bend radius is used so as not to induce microbend attenuation. The optical fiber is wound on a free-standing elliptical coil form with the minor axis nominally 2.3 inches and the major axis nominally 2.6 inches, but of course the coils may be made in any size. The winding pattern may be fully symmetric quadrapole with an equal number of turns on all layers. After the free-standing coil is wound it may be potted using ultraviolet material to minimize temperature induced non-reciprocity errors. A suitable potting material is Optelecon No. OS1119. The support and alignment member 20 may be also formed of ultraviolet acrylate material to closely match the thermal expansion coefficient of the coils. This makes for a well-matched and lightweight construction.

Figure 6:
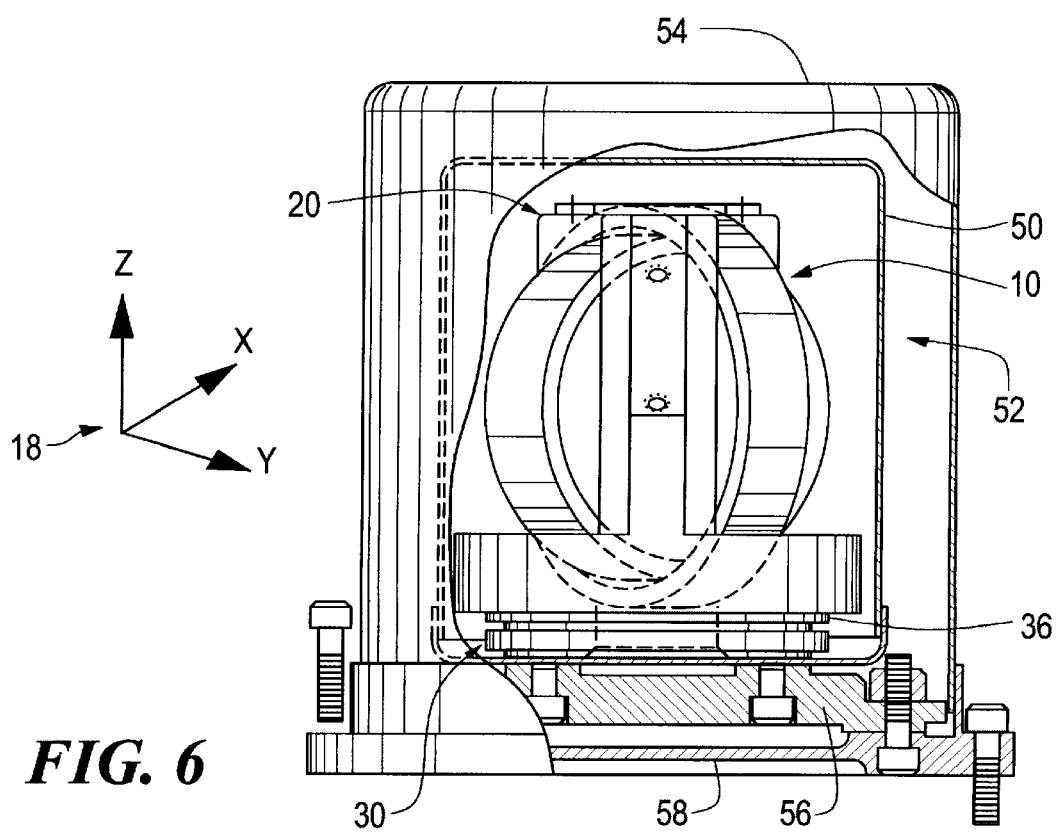
FIG. 6 is a schematic side elevational view with portions in cross section and portions broken away showing a more detailed construction of the gyro system of this invention.

In order to achieve high performance across a large environmental range, the gyro system 10 with structure 20 may be mounted within a magnetically shielded container 50, FIG. 6, to shield the fiber optics from magnetic fields, which can interfere with their operation. Temperature control may be achieved, for example, by mounting using a foil heater and temperature sensors, not shown, on the magnetic shield 50, to maintain constant the temperature of the coils. Further thermal stability can be ensured by using an insulation 52 in the space between outer housing 54 and magnetic shield 50. Such insulation can be a vacuum, an inert gas, a Dewar construction, or the use of an insulating material. Shield 50 is mounted to insulating member 56 which in turn is mounted to the mounting base 58.

Figure 7:
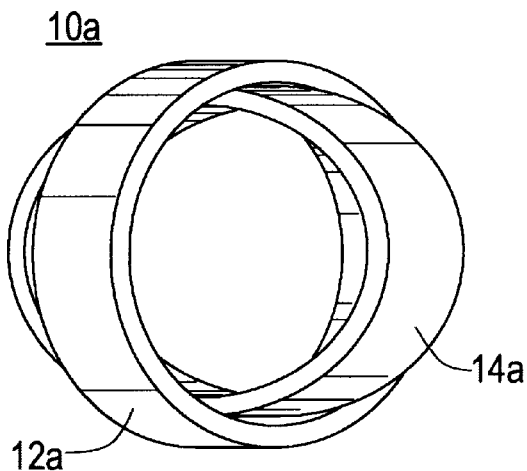
FIG. 7 is a three-dimensional schematic view showing a simpler two-coil two-axis gyro system according to this invention using elliptical coils.
Figure 8:
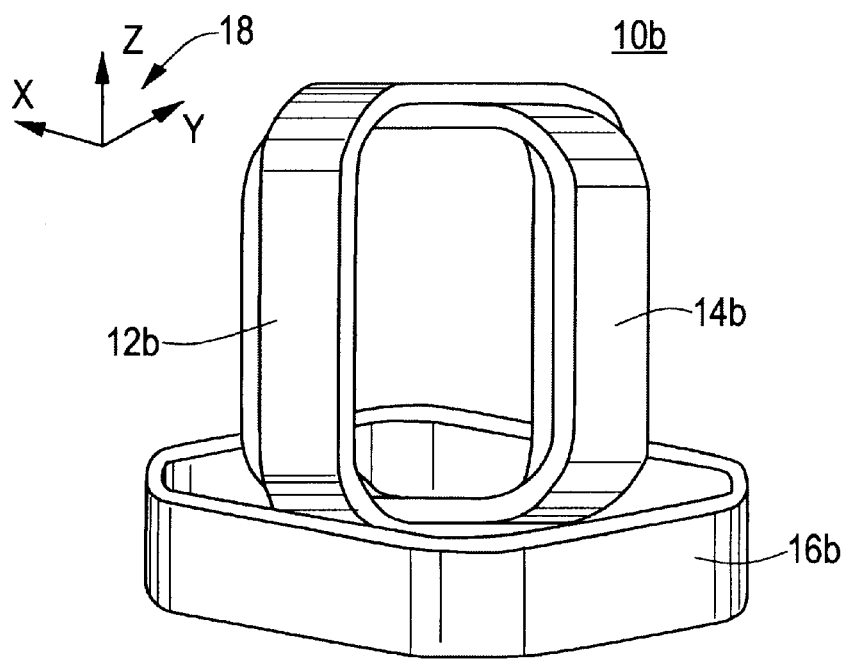
FIG. 8 is a three-dimensional schematic view showing three equally sized oblong coils mounted mutually traverse to one another in accordance with this invention.

Although thus far the device has been shown using three coils for a three-axis gyro system, this is not a necessary limitation of the invention: more or fewer coils may be used. For example, two coils for two-axis sensing can be used as shown by the gyro system 10a, FIG. 7, which uses two nested coils 12a and 14a that are both ellipses equal in size and mutually transverse to one another (actually shown orthogonal to each other). Although thus far the coils have been shown as ellipses, this is not a necessary imitation of the invention as any shape which permits nesting will suffice. For example, in FIG. 8 gyro system 10b includes three mutually transverse rectangular coils which are orthogonal to one another. The rectangular coils are equal and equal in size so that coil 14b nests within coil 12b and both nest within coil 16b. Here the narrower dimension of coil 14b nests in the longer dimension of coil 12b and the narrower dimension of coil 14 can nest either in the longer dimension or in a diagonal dimension of coil 16b. Although in this specific disclosure only elliptical and rectangular coils are illustrated, this is not a limitation of the invention as any other oblong form other than elliptical and rectangular can be used.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A nested fiber optic gyro system comprising:
   at least a first fiber optic coil having a predetermined shape and size and
   at least a second fiber optic coil having the same shape and size as said first coil and nested within and transversely to said first coil.
2. The nested fiber optic gyro system of claim 1 including a third fiber optic coil nested with and transverse to said first and second coils.
3. The nested fiber optic gyro system of claim 2 in which said third coil surrounds the first and second coils.
4. The nested fiber optic gyro system of claim 2 in which said third coil has the same shape and size as said first and second coils.
5. The nested fiber optic gyro system of claim 1 in which said first and second coils are oblong.
6. The nested fiber optic gyro system of claim 1 in which said first and second coils are elliptical.
7. The nested fiber optic gyro system of claim 2 in which said first, second and third coils are elliptical.
8. The nested fiber optic gyro system of claim 2 in which said first and second coils are rectangular.
9. The nested fiber optic gyro system of claim 2 in which said first, second and third coils are rectangular.
10. The nested fiber optic gyro system of claim 1 in which said first and second coils are orthogonal to one another.
11. The nested fiber optic gyro system of claim 2 in which said first, second and third coils are mutually orthogonal.
12. The nested fiber optic gyro system of claim 1 including a support and alignment structure having four spaced alignment elements defining two transverse mounting channels one for supporting each of said transverse nested first and second coils.
13. The nested fiber optic gyro system of claim 2 including a support and alignment structure having four spaced alignment elements defining two transverse mounting channels one for supporting each of said transverse nested first and second coils, said third coil being mounted on said base surrounding and transverse to said first and second coils.
14. A nested fiber optic gyro system comprising:
   a first elliptical fiber optic coil having a predetermined size; and
   a second elliptical fiber optic coil having the same size as said first coil and nested within and transversely to said first coil.
15. The nested fiber optic gyro system of claim 14 in which said coils are orthogonal to one another.
16. A nested fiber optic gyro system comprising:
   first, second and third elliptical fiber optic coils having the same size nested within and transversely to each other.
17. The nested fiber optic gyro system of claim 16 in which said coils are mutually orthogonal to one another.

* * * * *

UNITED STATES PATENT AND TRADEMARK OFFICE
CERTIFICATE OF CORRECTION

PATENT NO.    : 6,198,094 B1
DATED         : March 6, 2001
INVENTOR(S)   : Freier et al.

It is certified that error appears in the above-identified patent and that said Letters Patent is hereby corrected as shown below:

<u>Column 1,</u>
Line 7, insert the following:
-- GOVERNMENT INTEREST
  This invention was made with Government support under Contract No. DAAH10-98-C-0021 awarded by the Aviation Applied Technology Directorate, U.S. Army Aviation and Missile Command. The Government has certain rights in the invention. --

Signed and Sealed this

Fifteenth Day of October, 2002

*Attest:*

JAMES E. ROGAN
*Attesting Officer*        *Director of the United States Patent and Trademark Office*